US011221029B2

(12) United States Patent
Breeser

(10) Patent No.: US 11,221,029 B2
(45) Date of Patent: Jan. 11, 2022

(54) SANITARY BAG CLAMP FOR BINS

(71) Applicant: Graco Minnesota Inc., Minneapolis, MN (US)

(72) Inventor: David L. Breeser, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 299 days.

(21) Appl. No.: 16/297,291

(22) Filed: Mar. 8, 2019

(65) Prior Publication Data

US 2019/0285099 A1 Sep. 19, 2019

Related U.S. Application Data

(60) Provisional application No. 62/642,350, filed on Mar. 13, 2018.

(51) Int. Cl.
*F16B 2/12* (2006.01)
*B65D 90/04* (2006.01)

(52) U.S. Cl.
CPC ............... *F16B 2/12* (2013.01); *B65D 90/04* (2013.01)

(58) Field of Classification Search
CPC ........ B65D 90/04; F16B 15/0046; F16B 2/12; F16B 2/185
See application file for complete search history.

(56) References Cited

U.S. PATENT DOCUMENTS

| | | |
|---|---|---|
| 1,459,094 A | 6/1923 | French |
| 1,850,695 A | 3/1932 | Scott |
| 2,498,725 A | 2/1950 | Thornburg |
| 2,929,422 A | 3/1960 | Tyler et al. |
| 3,278,177 A | 10/1966 | Zern |
| 3,297,287 A | 1/1967 | Larson |
| 4,182,386 A | 1/1980 | Alack |
| 4,854,565 A | 8/1989 | Ritsch |
| 6,402,131 B1 * | 6/2002 | Baculy ............... B25B 1/205 269/147 |
| 6,860,475 B2 | 3/2005 | Wong |
| 7,950,636 B2 | 5/2011 | Kinnison et al. |
| 2003/0110604 A1 * | 6/2003 | Kennard ............ F21V 21/088 24/569 |

(Continued)

FOREIGN PATENT DOCUMENTS

FR 2381445 A7 9/1978

*Primary Examiner* — David M Upchurch
(74) *Attorney, Agent, or Firm* — Kinney & Lange, P.A.

(57) ABSTRACT

A clamp mountable on a corner of a bin to secure a bag to the bin includes a top portion and a bottom portion moveable in a sliding relationship relative to the top portion. The top portion has a first and second inner clamp members arranged orthogonally relative to one another. The first and second inner clamp members extend downward from a bottom surface of the top portion and are configured to be located on adjacent inner walls of the bin. The bottom portion has a first and second outer clamp members arranged orthogonally relative to one another. The first and second outer clamp members extend downward from a bottom surface of the bottom portion. The first and second inner clamp members are aligned with the first and second outer clamp members, respectively, to pinch a wall of the bin.

20 Claims, 5 Drawing Sheets

(56) References Cited

U.S. PATENT DOCUMENTS

| | | | |
|---|---|---|---|
| 2006/0284358 A1* | 12/2006 | Ben-Gigi | B25B 5/142 269/41 |
| 2008/0258368 A1* | 10/2008 | Kinnison | B25B 5/142 269/41 |
| 2011/0087226 A1* | 4/2011 | Murner | F16B 2/12 606/54 |
| 2014/0033509 A1* | 2/2014 | Sidwell | F16M 13/022 29/525.08 |

* cited by examiner

SANITARY BAG CLAMP FOR BINS

CROSS-REFERENCE TO RELATED APPLICATION(S)

This application claims the benefit of U.S. Provisional Application No. 62/642,350 filed Mar. 13, 2018 for "Sanitary Bag Clamp for Bins" by D. L. Breeser.

BACKGROUND

The present disclosure relates generally to bin evacuation systems used in food processing and more particularly to securing a bag to a bin.

Bin evacuation systems are used in food processing facilities to remove thick food products from large bulk containers, referred to herein as bins. Bins are rectangular in shape and can be several feet in length, width, and height. Bins are commonly made from cardboard, wood or plastic and can have varying wall thicknesses. Food product contained within a bin is sealed in a sterile bag within the bin prior to evacuation. In preparation for evacuation, the sterile bag is opened at a top end of the bin and pulled over the outside walls of the bin to expose the food.

Bin evacuation systems typically include a rectangular follower plate with outer edge dimensions that allow the follower plate to fit just inside an inner perimeter of the bin with an inch or less clearance to the inside walls of the bin. An elastomeric seal can surround a perimeter of the follower plate to bridge a gap between an outside perimeter of the follower plate and inside surface of the sterile bag lining the bin. The elastomeric seal engages the inside surface of the bag to create a sealed cavity inside of the bin below the follower plate.

Several pumps with inlet ports open to the cavity can be mounted to a top surface of the follower plate. The pumps pull food from inside the bin and sterile bag and pump the food to a system of pipes for transport to additional processing machines.

A large pneumatic cylinder, or gang of cylinders working in tandem can apply downward force to the top of the follower plate to effectively "follow" a top level of the food product in the bin all the way to an inside bottom of the bin or sterile bag as the food product is pumped out. In this way, the food can be efficiently removed, leaving minimal residual food product in the sterile bag.

In order for the follower plate and elastomeric seal to effectively scrape the inside walls of the sterile bag, the bag must be adequately secured at a top edge of the bin. Without adequate securing of the sterile bag, the follower plate will have a tendency to pull the bag downward, causing the bag to bunch up at the bottom of the bin and impede complete evacuation of the food from the sterile bag.

Various methods have been employed to secure the sterile bag at the top of the bin. For example, ducting tape, packing tape, or a ratcheting strap can be wrapped around the outside of the bin to secure flaps of the opened sterile bag to the outside walls of the bin. Alternatively, sterile bag flaps can be secured to a heavy apparatus, such as a rod, which can be hung on the outside of the bin to pull the sterile bag flaps taut down over the top edge of the bin. Each of these methods is typically cumbersome, labor intensive, and sometimes ineffective, particularly if the follower plate is not precisely aligned with the inner walls of the bin. The process of preparing the bin for evacuation requires properly locating the bin below the follower plate. The bin is transported to an underside of an elevated follower plate by means of a pallet jack, fork lift, or roller conveyor. Precise location is required to assure that the follower plate will lower inside the bin without catching the top edge of the bin wall. The process usually requires the user to interface with the follower plate to effectively align the follower plate to the opening of the bin. This alignment process involves a certain risk of injury as the user's hand or fingers may be pinched between the follower plate and the bin walls.

A mechanism for effectively securing the sterile bag at the top of the bin and properly locating the follower plate with respect to the bin is needed.

SUMMARY

A clamp mountable on a corner of a bin to secure a bag to the bin includes a top portion and a bottom portion moveable in a sliding relationship relative to the top portion. The top portion has a first inner clamp member and a second inner clamp member arranged orthogonally relative to the first inner clamp member. The first and second inner clamp members extend downward from a bottom surface of the top portion and are configured to be located on adjacent inner walls of the bin. The bottom portion has a first outer clamp member a second outer clamp member arranged orthogonally relative to the first outer clamp member. The first and second outer clamp members extend downward from a bottom surface of the bottom portion. The first and second inner clamp members are aligned with the first and second outer clamp members, respectively, to pinch a wall of the bin.

The present summary is provided only by way of example, and not limitation. Other aspects of the present disclosure will be appreciated in view of the entirety of the present disclosure, including the entire text, claims and accompanying figures.

Figure 1:
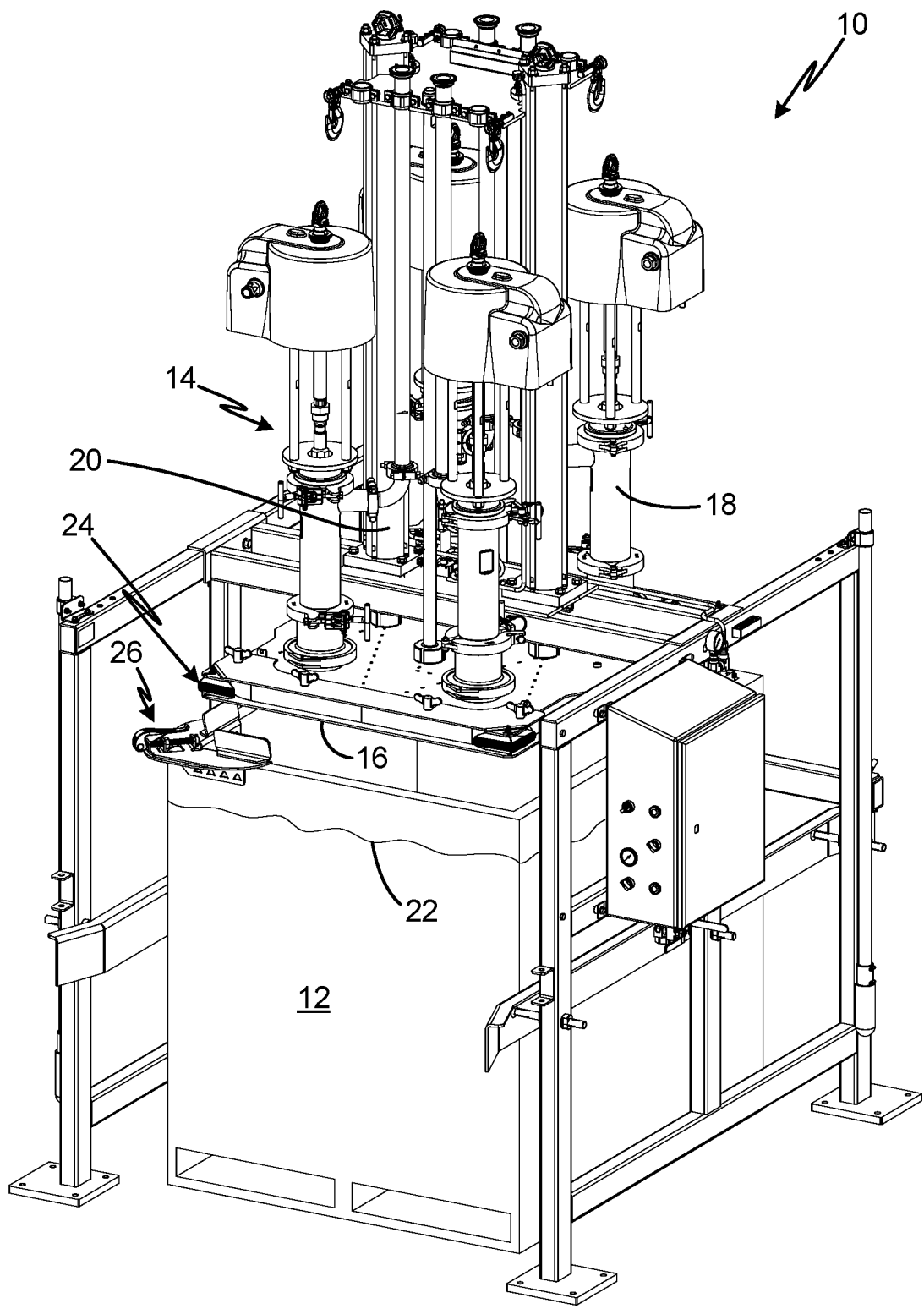
FIG. 1 is a perspective view of a bin evacuation system with a sanitary bag clamp.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure provides a sanitary bag clamp capable of effectively securing a sanitary bag at a top edge of a bulk food container or bin throughout a bin evacuation process using a conventional bin evacuation system. The sanitary bag clamp is further capable of guiding a follower plate of the bin evacuation system into the bin in a manner that allows an operator to safely lower the follower plate inside of the bin without catching the top edge of the bin or sterile bag.

Figure 2:
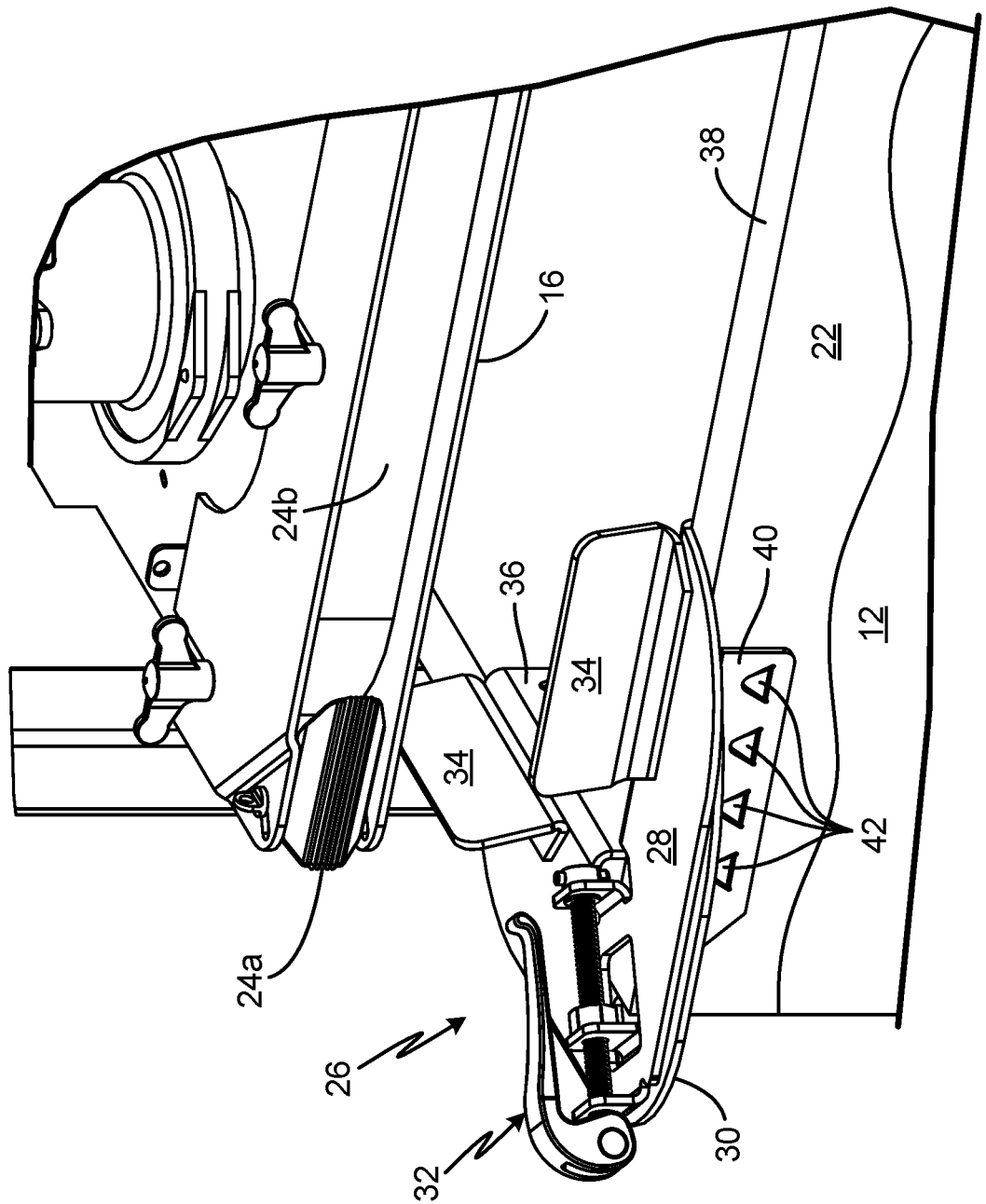
FIG. 2 is a perspective view of a portion of the bin evacuation system of FIG. 1 with the sanitary bag clamp secured to a bin.
Figure 3:
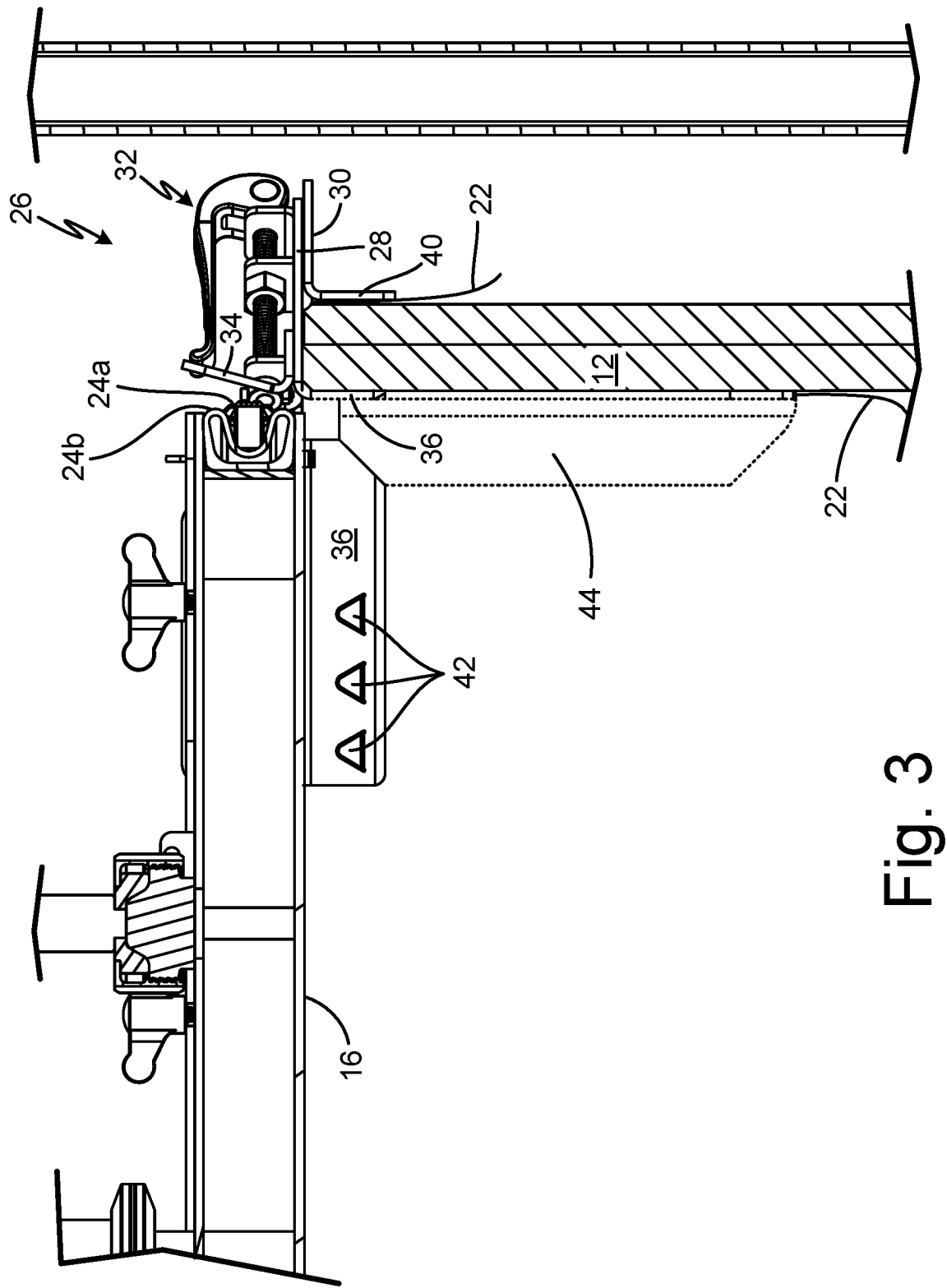
FIG. 3 is a cross-sectional view of the sanitary bag clamp secured to the bin.

FIG. 1 shows a perspective view of a conventional bin evacuation system 10 used to remove material stored in bin 12. Bin evacuation system 10 can be used to remove thick food products, such as tomato paste and peanut butter, from bulk storage bins 12 in food processing facilities. Bin evacuation system 10 includes pump and actuator cylinder assembly 14 connected to follower plate 16. Pump and actuator cylinder assembly 14 can include one or more pumps 18 mounted with inlet ports open to the bottom side of follower plate 16 and configured to pump food product stored in bin 12. Pump and actuator cylinder assembly 14 can further include one or more cylinders 20 for moving follower plate 16 vertically up and down. Cylinders 20 can be pneumatically operated. Food product can be stored in bin 12 in a sterile plastic bag 22, which can conform to inner walls of bin 12 and enclose the food product. Prior to food product evacuation, a top of bag 22 can be opened (i.e., cut from corner to corner of bin 12) and excess bag material can be folded over each wall of bin 12. Follower plate 16 can be positioned on a top level of the food product and moved downward to follow the food product as the food product is evacuated through pumps 18. Follower plate 16 includes seal 24, positioned around an outer perimeter of follower plate 16 and configured to engage an inner surface of bag 22. Seal 24 can scrape the food product from the inner surface of bag 22 and ensure that food product is forced downward with follower plate 16 and does not escape between the inner surface of bag 22 and seal 24. As illustrated in FIGS. 2 and 3, seal 24 can include a corner seal portion 24a and an inflatable seal 24b. Tight interference between the inner surface of bag 22 and seal 24 can cause seal 24 to pull bag 22 downward with follower plate 16 if bag 22 is not sufficiently secured.

A bag clamp 26 can be provided at a corner of bin 12 to effectively secure bag 22 over a top edge of bin 12 to counteract the downward pulling force of seal 24 on bag 22. Ideally, a bag clamp 26 is provided at each of the four corners of bin 12 (only one bag clamp is shown). FIG. 2 shows a perspective view of bag clamp 26 secured to bin 12 and a portion of follower plate 16. Bag clamp 26 includes top portion 28, bottom portion 30, and adjustment mechanism 32. Top portion 28 and bottom portion 30 can be slideably engaged with positions of top and bottom portions 28 and 30 adjusted relative to one another by adjustment mechanism 32. Top portion 28 includes guides 34, configured to guide follower plate 16, and inner clamp members 36, configured to engage the inner surface of bag 22 and bin 12. Guides 34 can be separate plates extending upward from a top surface of top portion 28 and angled away from the inner surface of bin 12 (i.e., sloping downward toward the opening of bin 12) to help guide follower plate 16 into the opening of bin 12 to account for misalignment there between and prevent follower plate 16 from engaging the top edge 38 of bin 12. Inner clamp members 36 extend downward from the top surface of top portion 28 to extend into bin 12 along inner wall surfaces of adjacent walls of bin 12. Bottom portion 30 includes outer clamp members 40, configured to engage bag 22 and bin 12 on the outer wall surface of bin 12. Outer clamp members 40 extend downward from a bottom surface of bottom portion 30 to engage the outer wall surfaces of the adjacent walls of bin 12. Adjustment mechanism 32 can be used to position inner and outer clamp members 36 and 40 on inner and outer walls of bin 12, respectively. Adjustment mechanism 32 is configured to secure top and bottom portions 28 and 30 of clamp 26 in positions of tight engagement with bag 22 and bin 12 on both inner and outer walls of bin 12.

Inner and or outer clamp members 36 and 40 can additionally include one or more grips 42, configured to further secure bag 22 and to prevent clamp 26 from lifting from bin 12 during bin evacuation. As illustrated in FIG. 2, grips 42 can be cutouts in outer clamp member 40 that project outward (i.e., toward bin 12 in the orientation shown in FIG. 2) such that the projecting features can engage bag 22 and/or bin 12. In alternative embodiments, grips can be textured surfaces or projecting members capable of engaging with bag 22 and/or bin 12.

FIG. 3 shows a cross-sectional view of bag clamp 26 secured to bin 12. As illustrated in FIG. 3, outer clamp member 40 and inner clamp member 36 are aligned vertically to match the outer wall surface and inner wall surface of bin 12, respectively. Guides 34 (only one shown) can extend upward from top portion 28 from a position in line with or slightly outward from inner clamp members 36. Guides 34 are angled relative to vertical such that guides 34 extend toward a top surface of top portion 28. As illustrated in FIG. 3, guides 34 can be used to help guide follower plate 16 into bin 12 in case of misalignment between follower plate 16 and the bin opening.

As illustrated in FIG. 3, inner clamp member 36 and top portion 28 can be formed from a single plate of metal, such as stainless steel, shaped by bending. Likewise, outer clamp member 40 and bottom portion 30 can be formed from a single plate of metal, such as stainless steel, shaped by bending. Guides 34 can be separate pieces of metal, such as stainless steel, shaped by bending and welded or otherwise secured to the top surface of top portion 28.

As illustrated in FIG. 3, the wall of bin 12 can be pinched by and between inner clamp member 36 and outer clamp member 40 to secure clamp 26 onto bin 12. Although only one wall is shown, it will be understood that the adjacent bin wall is also pinched by and between an inner clamp member 36 and outer clamp member 40 of clamp 26. The spacing between inner clamp member 36 and outer clamp member 40 can be adjusted by adjustment mechanism 32. As shown in FIG. 3, bag 22 is pinched by and between inner clamp member 36 and the inner wall surface of bin 12 and also pinched by and between outer clamp member 40 and the outer wall surface of bin 12. In this way, bag 22 is secured on both the inside and outside of bin 12.

In some embodiments, clamp 26 can include tongue 44 (shown in phantom). Tongue 44 can have an orthogonal "V" or "U" shape, configured to fit within the inside corner of bin 12 and maintain bag 22 against the inner surfaces of the adjacent walls of bin 12 where the adjacent walls meet. Tongue 44 extends downward from inner clamp member 36, such that tongue 44 extends further into bin 12 than inner clamp member 26. In a non-limiting example, tongue 44 can extend approximately 30 cm into a 70 cm deep bin. Tongue 44 can be formed from a single piece of metal, such as stainless steel, and shaped by bending. Tongue 44 is optional and may not be necessary in all applications. Bag 22 can have a higher tendency to bunch, fold, and/or get caught in the corner of bin 12 with certain food products as follower plate 16 is lowered, potentially dislodging or tearing bag 22. In such applications, tongue 44 can press bag 22 against the corner to prevent such unintended occurrence.

Figure 4:
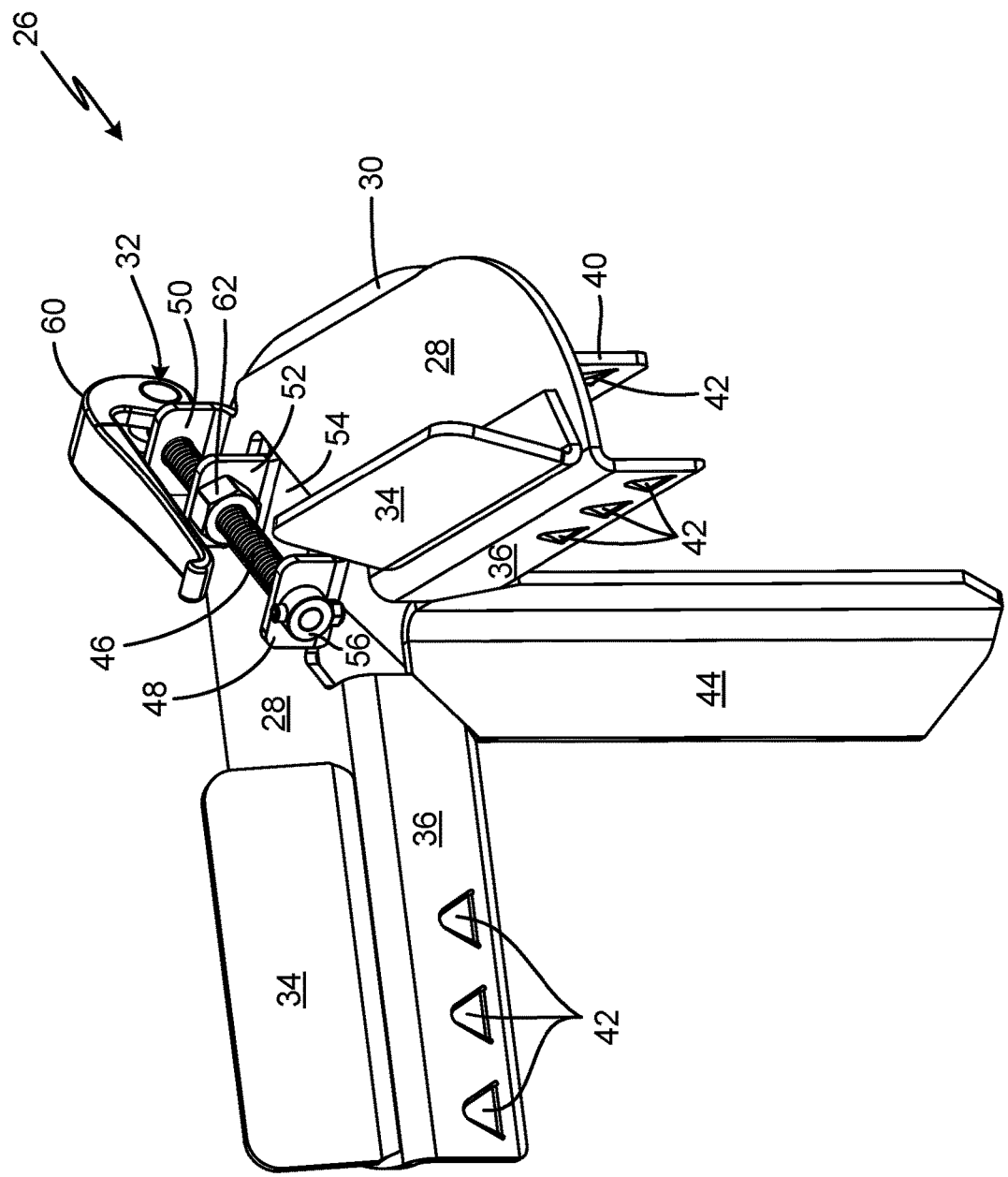
FIG. 4 is a perspective view of the sanitary bag clamp.
Figure 5:
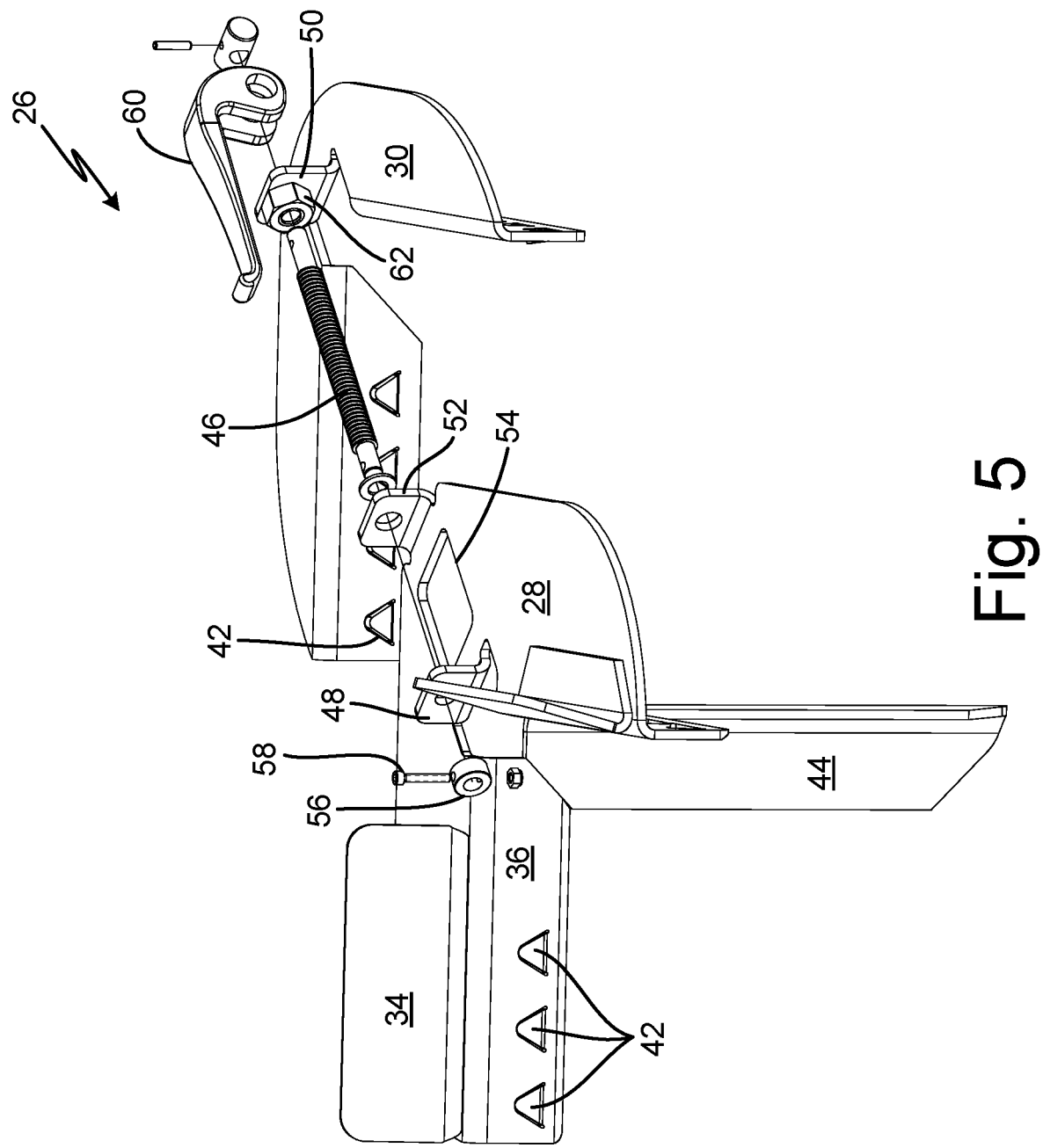
FIG. 5 is an exploded view of the sanitary bag clamp.

FIGS. 4 and 5 show perspective unexploded and exploded views of bag clamp 26, respectively. As illustrated, top portion 28 includes inner clamp members 36, which are elongated and positioned orthogonally relative to one another and to the top surface of top portion 28 and extend downward from the top surface of top portion 28. Separate guides 34 are attached to the top surface of top portion 28. Guides 34 are elongated and extend upward from the top surface at an angle relative to inner clamp member 36 to provide additional clearance for and to help guide follower plate 16 into bin 12. Optional tongue 44 separates and is secured to inner clamp members 36. Optional tongue 44 has an orthogonal "U" shape, configured to press bag 22 into the inner corner of bin 12, and extends downward from inner clamp members 36 to help maintain the position of bag 22 as follower plate 16 moves downward in bin 12. Bottom portion 30 includes outer clamp members 40, which are elongated and positioned orthogonally relative to one another and to the bottom surface of bottom portion 30 and extend downward from the bottom surface of bottom portion 30. As illustrated, both inner clamp members 36 and outer clamp members 40 can include a plurality of grips 42. Grips 42 can be cutouts in inner and outer clamp members 36 and 40 (e.g., formed by laser or water jet), configured to engage bag 22 and/or bin 12. Grips 42 can have a generally triangular shape with rounded point capable of applying pressure against walls of bin 12 while limiting the potential for tearing bag 22. Grips 42 on inner clamp member 36 project toward outer clamp member 40 to secure bag 22 on the inner wall surface of bin 12, while grips 42 on outer clamp member 40 project toward inner clamp member 36 to secure bag 22 on the outer wall surface of bin 12.

A flat bottom surface of top portion 28 can engage and slide on a top surface of bottom portion 30 to adjust spacing between inner clamp members 36 and outer clamp members 40. The relative movement between top portion 28 and bottom portion 30 (and likewise between inner clamp members 36 and outer clamp members 40) is controlled by adjustment mechanism 32. Adjustment mechanism 32 includes rod 46, which engages top portion 28 and bottom portion 30. Rod 46 can extend through apertures in flanges 48 and 50 on top portion 28, and an aperture in flange 52 on bottom portion 30. Flanges 48 and 50 extend upward from the top surface of top portion 28. Flange 52 extends upward from the top surface of bottom portion 30 and through a void 54 in top portion 28 to align apertures in flanges 48, 50, and 52. Middle flange 52 is directly moveable between outer flanges 48 and 50. A collar 56 can be secured to an end of rod 46 via pin 58 and a handle 60 can be secured to an opposite end of rod 46 with mechanism 62 such that rod 46 remains positioned through flanges 48, 50, and 52 and can rotate with handle 60. Other mechanisms for securing rod are contemplated.

A threaded piece 62 (shown as a nut) can be fixed to or otherwise integrated into middle flange 52. Rod 46 extends through and interfaces with threaded piece 62. Rotation of rod 46, such as by handle 60, forces threaded piece 62, middle flange 52, and bottom portion 30 to move relative to top portion 28 because the interfacing of top portion 28 with bottom portion 30 (e.g., middle flange 52 extending through void 54) prevents relative rotation. As such, as rod 46 is rotated, inner clamp member 36 is moved closer to or further from outer clamp member 40, depending on the direction of rotation. In this way, adjustment mechanism 32 converts rotational input motion to linear output motion to secure and unsecure clamp 26 on bin 12. Handle 60 can include a locking mechanism to prevent rotation of rod 46 during evacuation of bin 12. As illustrated in FIG. 4, handle 60 can fold to restrict rotational movement, although other mechanisms are contemplated.

To prepare a full bin 12 for evacuation, bag 22 is opened and excess bag material is pulled up and over the walls of bin 12 to the outer surfaces of the walls of bin 12. Clamp 26 is then placed at a corner of bin 12 over the excess bag material. Ideally four clamps 26 are used to secure bag 22 with one clamp 26 positioned at each corner of bin 12. The user can turn handle 60 to tighten clamp 26 to secure bag 22 against both inner and outer wall surfaces of bin 12 and thereby prevent follower plate 16 from pulling bag 22 downward as follower plate 16 is lowered into bin 12. Clamp 26 combines both the function of securing bag 22 and the function of guiding follower plate 16 into bin 12. Clamp 26 provides for a higher level of safety by eliminating the need for human interface to guide follower plate into bin 12 and allowing the user to stay clear of a potential pinch point.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

While top and bottom portions 28 and 30 are referenced herein having a general directional relationship, it should be understood that these parts could instead be referenced as first and second portions independent of such relationship. Likewise, all other parts referenced herein having such a directional relationship, such as inner and outer (e.g., with regard to clamp portions 36 and 40) can be referred to as first and second independent of such positional relationship. All parts of clamp 26 can be formed from metal, such as stainless steel, or material capable of withstanding stress of heavy machinery used to operating bin evacuation system 10.

The invention claimed is:

1. A clamp mountable on a corner of a bin to secure a bag to the bin, the clamp comprising:
   a top portion comprising:
      a top plate;
      a first inner clamp member; and
      a second inner clamp member arranged at an angle relative to the first inner clamp member,
      wherein the first and second inner clamp members extend downward from a bottom surface of the top plate and are configured to be located on adjacent inner walls of the bin, and
      wherein the first and second inner clamp members together define an open inner space, and the top plate is bounded by the first and second inner clamp members and extends from the first and second inner clamp members away from the open inner space; and
   a bottom portion moveable in a sliding relationship relative to the top plate and comprising:
      a first outer clamp member; and
      a second outer clamp member arranged at an angle relative to the first outer clamp member, wherein the first and second outer clamp members extend downward from a bottom surface of the bottom portion;
   wherein the first and second inner clamp members are aligned with the first and second outer clamp members, respectively, to pinch a wall of the bin.

2. The clamp of claim 1, wherein at least one of the first inner clamp member, second inner clamp member, first outer clamp member, and second outer clamp member comprises a grip configured to engage and hold the bag against the bin.

3. The clamp of claim 2, wherein the grip is a cutout member that projects outward from a surface of the at least one of the first inner clamp member, second inner clamp member, first outer clamp member, and second outer clamp member.

4. The clamp of claim 3, wherein the cutout member has a triangular shape with a rounded point, wherein the rounded point is directed upward toward top and bottom portions.

5. The clamp of claim 2, wherein the top portion further comprises a tongue extending downward from the bottom surface of the top portion and positioned between first and second inner clamp members to fit an inner corner of the bin at the intersection of the adjacent walls.

6. The clamp of claim 5, wherein the tongue has a substantially "V" or "U" shape configured to press against each of the adjoining walls at the inner corner of the bin.

7. The clamp of claim 6, wherein the tongue extends downward a greater distance from the bottom surface of the top portion than the first and second inner clamp members.

8. The clamp of claim 2, wherein the top portion further comprises one or more guides that extend upward from a top surface of the top portion.

9. The clamp of claim 8, wherein the one or more guides are angled to slope toward the top surface of the top portion and an inside of the bin to direct a follower plate into the bin.

10. The clamp of claim 9, wherein the one or more guides comprise a first guide and a second guide, wherein the first guide extends from the top surface of the top portion above the first inner clamp member and the second guide extends from the top surface of the top portion above the second inner clamp member.

11. The clamp of claim 2, wherein the top portion further comprises a void through which a first flange of the bottom portion extends and sized to allow movement of the first flange within the void as the clamp is tightened and loosened.

12. The clamp of claim 11, wherein the top portion further comprises second and third flanges, wherein the second and third flanges extend upward from the top surface of the top portion and are aligned with the first flange with the first flange separating the second and third flanges.

13. The clamp of claim 12 and further comprising a threaded rod for tightening and loosening the clamp, wherein the threaded rod extends through each of the aligned first, second, and third flanges and is configured to move the first flange relative to the second and third flanges when the rod is rotated.

14. The clamp of claim 13, wherein the first flange comprises a threaded member through which the rod is threadedly engaged, wherein the threaded member is configured to transfer rotational motion of the rod to linear motion of the first flange within the void and thereby linear motion of the bottom portion and first and second outer clamp members.

15. A method of securing a bag to a bin for a bin evacuation process, the method comprising:
    locating the bag in the bin with an open end of the bag folded over first and second adjacent walls of the bin at a corner of the bin;
    mounting a clamp on the corner of the bin over the open end of the bag such that first and second inner clamp members are positioned inside of the bin to engage inner sides of the first and second adjacent walls, respectively, and such that the first and second outer clamp members are positioned outside of the bin to engage outer sides of the first and second adjacent walls, respectively; and
    rotating a rod to pinch the first wall of the bin between the first inner clamp member and the first outer clamp member and to pinch the second wall of the bin between the second inner clamp member and the second outer clamp member.

16. The method of claim 15, wherein each of the first inner clamp member, second inner clamp member, first outer clamp member, and second outer clamp member comprises a grip and wherein rotating the rod comprises engaging the bag with the grips and pressing the bag against the bin walls.

17. A clamp mountable on a corner of a bin to secure a bag to the bin, wherein the corner of the bin has adjacent first and second walls separating an interior of the bin from an exterior of the bin and a lip over which the bag is disposed, the clamp comprising:
    an inner clamp portion to engage inner sides of the adjacent first and second walls of the bin, wherein the inner clamp portion comprises:
        a first clamp member disposed adjacent to the first wall; and
        a second clamp disposed adjacent to the second wall; wherein the first and second inner clamp members together define an open inner space;
    an outer clamp portion to engage outer sides of the adjacent first and second walls of the bin, wherein the outer clamp portion is slideably engaged with the inner clamp portion; and
    a rod disposed through the inner clamp portion and the outer clamp portion and configured to move the outer clamp portion relative to the inner clamp portion to pinch the adjacent first and second walls of the bin and the bag between the inner clamp portion and the outer clamp portion;
    wherein the inner clamp portion is configured to extend over the lip of the bin and predominantly outward to an exterior of the bin.

18. The clamp of claim 17, wherein the outer clamp portion comprises a first flange through which the rod is disposed and wherein the inner clamp portion comprises second and third flanges through which the rod is disposed, the first flange being posited to separate the second and third flanges and configured to move relative to the second and third flanges when the rod is rotated.

19. The clamp of claim 18, wherein the each of the inner and outer clamp portions comprises a grip configured to engage and hold a bag against the inner and outer sides of the adjacent walls.

20. The clamp of claim 19, wherein the inner clamp portion comprises one or more guides that extend upward from the inner clamp portion at an angle to guide a follower plate into the bin.

* * * * *